(12) United States Patent
Baba et al.

(10) Patent No.: US 6,971,268 B2
(45) Date of Patent: Dec. 6, 2005

(54) PRESSURE SENSOR HAVING METALLIC DIAPHRAGM WITH CONVEXITY

(75) Inventors: Hironobu Baba, Obu (JP); Masatoshi Tokunaga, Chiryu (JP)

(73) Assignee: Denso Corporation, Kariya (JP)

( * ) Notice: Subject to any disclaimer, the term of this patent is extended or adjusted under 35 U.S.C. 154(b) by 27 days.

(21) Appl. No.: 10/802,729

(22) Filed: Mar. 18, 2004

(65) Prior Publication Data

US 2004/0187587 A1    Sep. 30, 2004

(30) Foreign Application Priority Data

Mar. 28, 2003  (JP) .............................. 2003-090972

(51) Int. Cl.⁷ ............................................... G01L 7/00
(52) U.S. Cl. ................................................. 73/706
(58) Field of Search ..................... 73/706, 715, 716, 73/717, 718, 719, 720, 721, 722, 723, 724, 73/725, 726, 727

(56) References Cited

U.S. PATENT DOCUMENTS

| 4,565,096 A | * | 1/1986 | Knecht | ........................ | 73/718 |
| 4,572,000 A | * | 2/1986 | Kooiman | ..................... | 73/718 |

FOREIGN PATENT DOCUMENTS

| JP | A-H07-167889 | 7/1995 |
| JP | U-H07-167889 | 7/1995 |
| JP | A-H11-132887 | 5/1999 |

* cited by examiner

*Primary Examiner*—William Oen
(74) *Attorney, Agent, or Firm*—Posz Law Group, PLC

(57) ABSTRACT

A pressure sensor includes a diaphragm for sealing liquid. The diaphragm includes a plurality of convexities, which are disposed concentrically on the diaphragm. Each convexity has a circular arc cross-section in a radial direction and has a ring shape. The sensor has a configuration factor. The configuration factor is in a range between 2.5 and 3.5. The diaphragm of the sensor has excellent deformability so that detection error of the sensor is reduced.

6 Claims, 4 Drawing Sheets

PRESSURE SENSOR HAVING METALLIC DIAPHRAGM WITH CONVEXITY

CROSS REFERENCE TO RELATED APPLICATION

This application is based on Japanese Patent Application No. 2003-90972 filed on Mar. 28, 2003, the disclosure of which is incorporated herein by reference.

FIELD OF THE INVENTION

The present invention relates to a pressure sensor having a metallic diaphragm with a convexity.

BACKGROUND OF THE INVENTION

Recently, emission standards for limiting emission gas emitted from a vehicle become strict. Specifically, emission gas, i.e., diesel particulate emitted from a diesel-powered vehicle is required to reduce. To reduce the diesel particulate, a diesel particulate filter (i.e., DPF) system is used for the diesel-powered vehicle. The DPF system includes a filter for trapping the diesel particulate. The filter is disposed in an exhaust pipe of the vehicle. When the diesel particulate is accumulated in the filter more than a predetermined amount, the diesel particulate is burned. Thus, the diesel particulate is limited from being discharged to the atmosphere.

The DPF system further includes a pressure sensor for detecting a pressure loss of the emission gas. The pressure loss is a difference between the emission gas before passing through the filter and after passing through the filter. The pressure sensor is used in a harsh environment such as in the emission gas. It is required to protect an IC chip, i.e., a pressure sensor chip for detecting the pressure. Therefore, it is not sufficient to protect the chip by using a gel. Thus, the chip is sealed in liquid by a metallic diaphragm so that the sensor provides a liquid sealed type pressure sensor.

This liquid sealed type pressure sensor includes a pressure introduction chamber, a pressure sensor chip and a metallic diaphragm. The metallic diaphragm separates the chip from a port side of the chamber so that the liquid (i.e., oil) is sealed in a space disposed on a chip side. Therefore, detection object (i.e., emission gas) for being detected by the pressure sensor does not contact the chip directly. Thus, the sensor can be used in such a harsh environment, i.e., a corrosion environment. However, the oil sealed in the space is thermally expanded or contracted by a change of atmospheric temperature so that the sensor may be failed. Specifically, the expansion or contraction may cause a detection error of the sensor.

When the liquid sealed type pressure sensor is used under comparatively high pressure, for example, higher than 1 MPa, the detection error of the sensor is small, so that the influence of the error is not taken into account substantially. However, when the liquid sealed type pressure sensor is used for the DPF system of the diesel-powered vehicle, the sensor is used under comparatively low pressure, for example, about 100 kPa. In this case, the detection error of the sensor becomes large, so that the influence of the error is necessitated to take into account.

In the above view, if the metallic diaphragm has an easily deformable construction, the expansion or the contraction of the oil by the temperature change can be relaxed (i.e., absorbed) by a deformation of the metallic diaphragm. Therefore, the detection error becomes small. This liquid sealed type pressure sensor having an easily deformable metallic diaphragm is disclosed in Japanese Patent Application Publication No. H11-132887. In general, in a case where the metallic diaphragm is formed as easily deformable diaphragm, it is effective to enlarge a diameter of the diaphragm. However, the size (i.e., dimensions) of the sensor becomes larger. Therefore, the sensor according to the prior art includes the metallic diaphragm having a convexity so that the diaphragm has a high deformability. Here, the convexity is formed concentrically on the diaphragm, i.e., the convexity has a corrugated shape.

In the prior art, the dimensions and/or the shape of the convexity of the diaphragm are determined experientially. Therefore, a relationship between the shape or dimensions of the convexity and the deformability of the diaphragm is not known obviously. For example, the prior art discloses that the convexity of the diaphragm has a height between 0.075 mm and 0.15 mm, and the convexity is formed in a region, which is disposed outside of two-thirds of the radius of the diaphragm. However, the prior art does not disclose about the correlation between the height and the width of the convexity. Further, the prior art merely disclose about the arrangement of the convexity disposed in a wide area on the diaphragm, so that the prior art does not disclose about the arrangement of the convexity on the diaphragm exactly. Therefore, even when the convexity is disposed in the above region, which is disposed outside of two-thirds of the radius of the diaphragm, the deformability of the diaphragm is not sufficient for absorbing the expansion or the contraction of the oil.

Thus, it is required to determine the dimensions of the convexity and the number of the convexities in order to obtain excellent deformability of the diaphragm, which provides the diaphragm to be largely deformable in order to absorb the expansion or the contraction of the oil caused by the temperature change.

SUMMARY OF THE INVENTION

In view of the above-mentioned problems, it is an object of the present invention to provide a pressure sensor having a metallic diaphragm with a convexity. Specifically, the diaphragm of the sensor has excellent deformability so that detection error of the sensor is reduced.

A pressure sensor includes a diaphragm for sealing liquid. The diaphragm includes a plurality of convexities, which are disposed concentrically on the diaphragm. Each convexity has a circular arc cross-section in a radial direction and has a ring shape. Each convexity has a length of the circular arc representing as L, a height of the convexity representing as H, a width of the convexity in the radial direction representing as W, and a pitch between two adjacent convexities in the radial direction representing as P. The diaphragm has an effective radius representing as R, and a distance between a center of the diaphragm and a center of the convexity disposed utmost outside of the diaphragm representing as r0. Here, the effective radius of the diaphragm is defined as a radius of a part of the diaphragm applied with pressure. The sensor has a configuration factor representing as α, which is defined as $$\alpha = \left(\frac{L}{H}\right) \times \frac{\left(\frac{L}{W}\right)}{P} \times \left(\frac{r0}{R}\right).$$

The configuration factor is in a range between 2.5 and 3.5.

The diaphragm of the sensor has excellent deformability so that detection error of the sensor is reduced. Specifically, expansion or contraction of liquid sealed in the diaphragm in accordance with atmospheric temperature change can be absorbed by the deformation of the diaphragm.

Preferably, the diaphragm has two convexities.

Preferably, the height of the convexity is in a range between 0.16 mm and 0.28 mm. The width of the convexity is in a range between 1.3 mm and 1.5 mm. The convexity is disposed outside of half of the effective radius of the diaphragm.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
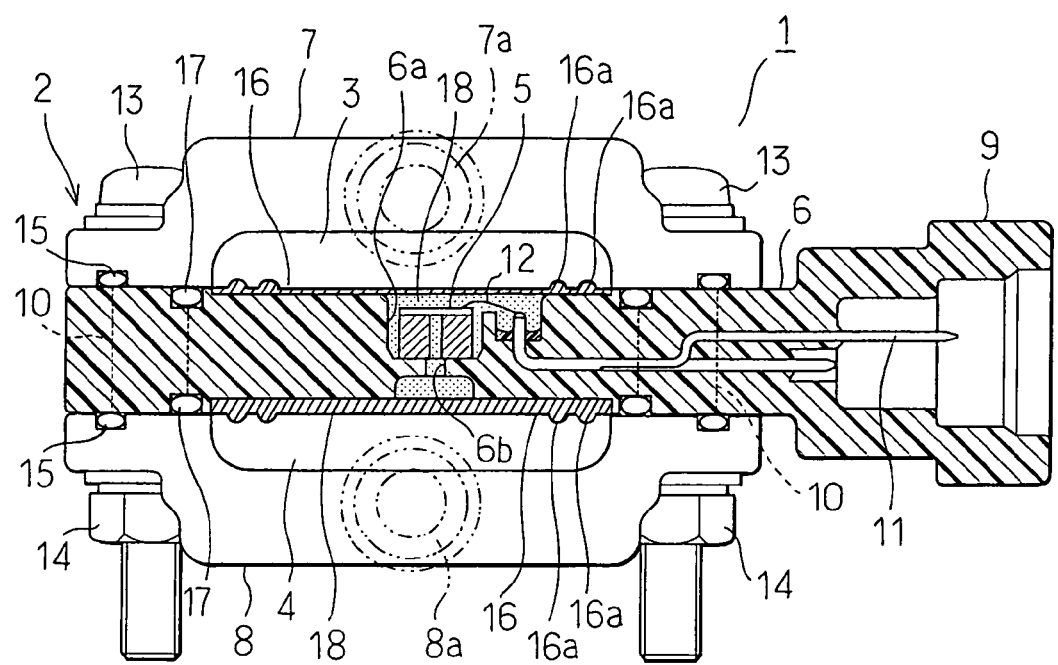
FIG. 1 is a cross sectional view showing a pressure sensor according to a preferred embodiment of the present invention.

A pressure sensor 1 having a metallic diaphragm 16 according to a preferred embodiment of the present invention is shown in FIG. 1. The pressure sensor 1 is a liquid sealed type pressure sensor. Specifically, the sensor 1 is a differential pressure type pressure sensor. The sensor 1 is used, for example, for detecting an emission gas pressure in a DPF system of a diesel-powered vehicle. Therefore, the sensor 1 is used under comparatively low pressure (e.g., 100 kPa).

The sensor 1 includes a casing 2 and a pressure sensor chip 5. The casing 1 includes the first pressure chamber 3 and the second pressure chamber 4 so that the casing includes two pressure chambers 3, 4. The casing is composed of a casing body 6, an upper casing 7 and a lower casing 8, which are integrated together.

The casing body 6 is made of plastic, and has a rectangular plate shape. The casing body 6 includes a connector housing 9 disposed on the right side in FIG. 1. Specifically, the connector housing 9 protrudes toward the right side of the casing body 6. The casing body 6 further includes a concavity 6a disposed in the center of the casing body 6. The pressure sensor chip 5 is mounted in the concavity 6a. A through hole 6b is formed on the bottom of the concavity 6a. The through hole 6b penetrates through the casing body 6. Multiple insert nuts 10 for connecting are disposed at four corners of the casing body 6. The insert nuts 10 are formed by insert molding method.

The casing body 6 further includes multiple terminals 11, which are formed by the insert molding method. One end of each terminal 11, which is a left end of the terminal in FIG. 1, is disposed near the pressure sensor chip 5. Specifically, the left end of the terminal 11 is exposed in the concavity 6a and disposed on the right side of the concavity 6a. A main part of the terminal 11 is disposed in the casing body 6, and extends toward right side of the casing body 6. Thus, the other end of the terminal 11 is disposed in the connector housing 9 so that the terminal 11 and the connector housing 9 provide a connector. Here, the one end of the terminal 11 protruding from the casing body 6 is sealed with a sealing material such as silicone.

The pressure sensor chip 5 is composed of a single crystalline silicon substrate, a pressure detection portion (i.e., a silicon diaphragm), four piezoelectric resistors and a base. The pressure detection portion is disposed on the center of the substrate, and has a thin thickness for providing the diaphragm. The piezoelectric resistors are disposed on the pressure detection portion, and the resistors provide a bridge circuit. The substrate having the pressure detection portion and the resistors is bonded to the base. Thus, the chip 5 is constructed.

The chip 5 is bonded to the bottom of the concavity 6a in the casing body 6 with an adhesive. Each electrode disposed on the chip 5 is electrically connected to the one end of the terminal 11 with a bonding wire 12. A through hole formed in the base of the chip 5 connects to the through hole 6b of the casing body 6 so that the through hole 6b penetrates between a lower side of the casing body 6 and a lower side (i.e., a backside) of the chip 5.

The upper casing 7 is a cover having a circular concavity. The upper casing 7 is disposed on the casing body 6 so that the first pressure chamber 3 is provided. The upper side of the chip 5, on which the pressure detection portion is disposed, faces the first pressure chamber 3. That is, the pressure detection portion of the chip 5 exposes in the first pressure chamber 3. A screw hole for a screw corresponding to the insert nut 10 of the casing body 6 is disposed in the upper casing 7. The first port 7a for connecting to the first pressure chamber 3 is integrally formed in the upper casing 7.

The lower casing 8 has a construction symmetric to the upper casing 7. The lower casing 8 is mounted on the bottom of the casing body 6 so that the second pressure chamber 4 is provided. The lower side of the chip 5, on which the pressure detection portion is disposed, connects to the second pressure chamber 4 through the through hole 6b. That is, the backside of the pressure detection portion of the chip 5 connects to the second pressure chamber 4. Another screw hole for a screw corresponding to the insert nut 10 of the casing body 6 is disposed in the lower casing 8. The second port 8a for connecting to the second pressure chamber 4 is integrally formed in the lower casing 8.

The circumference of the upper casing 7 is disposed on the top of the casing body 6, and the circumference of the lower casing 8 is disposed on the bottom of the casing body 6. A screw 13 is fixed to the insert nut 10 through the screw hole of the upper casing 7 from the upside of the upper casing 7. At that time, the top end of the screw 13 is screwed up with a nut 14 from the bottom of the lower casing 8. Thus, the upper casing 7, the casing body 6 and the lower casing 8 are integrally connected through a pair of O-rings 15 in this order. Specifically, one of the O-ring 15 is disposed between the upper casing 7 and the casing body 6, and the other O-ring 15 is disposed between the lower casing 8 and the casing body 6. Therefore, the first and second pressure chambers 3, 4 are air-tightly sealed.

A metallic diaphragm 16 is mounted in the first pressure chamber 3. The metallic diaphragm 16 has a disk shape, and includes a convexity 16a. The circumferential periphery of the metallic diaphragm 16 is sandwiched between the top of the casing body 6 and the bottom of the circumference of the upper casing 7. The top of the metallic diaphragm 16 and the bottom of the upper casing 7 is bonded with an adhesive (not shown) such as fluoro silicon compound. The bottom of the metallic diaphragm 16 and the top of the casing body 6 is air-tightly sealed with an O-ring 17.

Thus, the first pressure chamber 3 is separated into upper part and lower part with the metallic diaphragm 16. The lower part of the first pressure chamber 3 provides an oil sealing chamber disposed on the pressure sensor chip side so that oil 18 as sealed liquid is sealed in the oil sealing chamber. The oil 18 is, for example, fluoro oil or the like, which does not affect (i.e., damage) the pressure sensor chip 5.

Another metallic diaphragm 16 is mounted in the second pressure chamber 4 in the same manner as the metallic diaphragm 16 in the first pressure chamber 3, although the other metallic diaphragm 16 in the second pressure chamber 4 is mounted vertically symmetrically with the metallic diaphragm 16 in first pressure chamber 3. The circumferential periphery of the other metallic diaphragm 16 in the second pressure chamber 4 is sandwiched between the bottom of the casing body 6 and the top of the circumference of the lower casing 8. The bottom of the other metallic diaphragm 16 and the top of the lower casing 8 is bonded with an adhesive (not shown) such as fluoro silicon compound. The top of the other metallic diaphragm 16 and the bottom of the casing body 6 is air-tightly sealed with the O-ring 17.

Thus, the second pressure chamber 4 is separated into upper part and lower part with the other metallic diaphragm 16. The upper part of the second pressure chamber 4 provides another oil sealing chamber disposed on the pressure sensor chip side so that the oil 18 is sealed in the other oil sealing chamber. The oil 18 fills on the backside of the pressure detection portion of the pressure sensor chip 5 through the through hole 6b.

Here, the sensor 1 is mounted in, for example, an emission pipe of an engine of the diesel-powered vehicle. The first port 7a of the first pressure chamber 3 connects to the upstream side of a filter, and the second port 8a of the second pressure chamber 4 connects to the downstream side of the filter (not shown). The filter is disposed in the emission pile so that the filter filters emission gas, i.e., the filter traps diesel particulates. Thus, the sensor 1 detects a difference of pressure (i.e., a pressure loss) between the emission gas before passing through the filter and after passing through the filter.

Figure 2A:
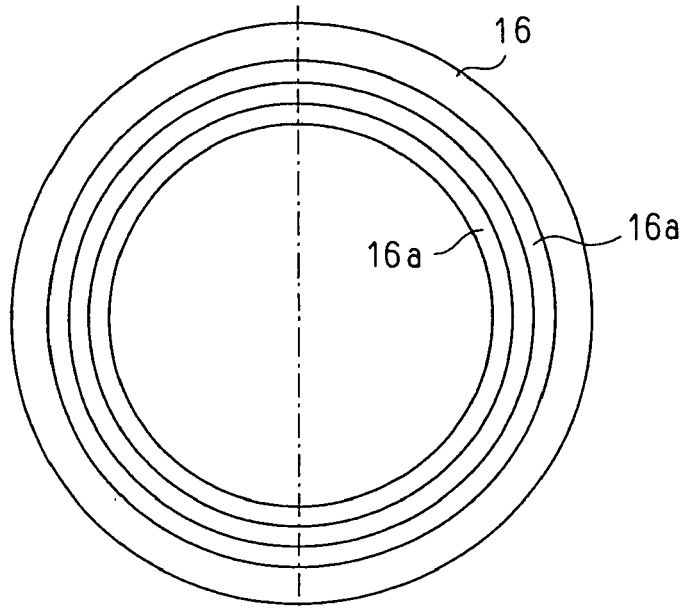
FIG. 2A is a plan view showing a metallic diaphragm of the sensor.
Figure 2B:
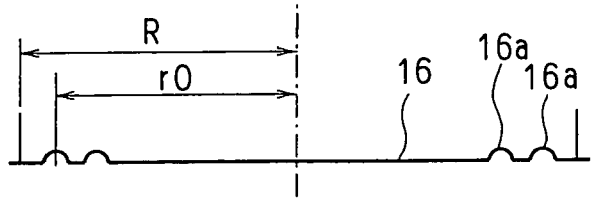
FIG. 2B is a cross sectional view showing the diaphragm of the sensor, according to the preferred embodiment.
Figure 3:
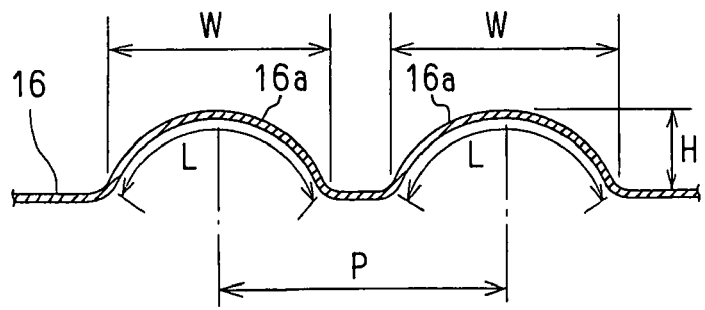
FIG. 3 is an enlarged cross sectional view showing a convexity of the diaphragm of the sensor, according to the preferred embodiment.

The detailed description of the metallic diaphragm 16 is shown in FIGS. 2A, 2B and 3. The diaphragm 16 is made of metal such as stainless steel, and has a thickness of 25 μm and a disk shape. Multiple convexities 16a are concentrically disposed on the surface of the diaphragm 16 and disposed on the periphery of the diaphragm 16. The convexities 16a having a ring shape are two convexities in the sensor 1 in this embodiment. The convexity 16 has a circular arc cross-section in a radial direction. The convexity 16a protrudes from the disk to the upside so that the diaphragm is corrugated.

The convexity 16a and the diaphragm 16 have following dimensions. As shown in FIG. 3, L represents a length of the circular arc of the convexity 16a, H represents a height of the convexity 16a, W represents a width of the convexity in the radial direction, P represents a pitch (i.e., a distance) between the centers of two convexities 16a in the radial direction, r0 represents a radius of the convexity 16a disposed on utmost outer side (i.e., r0 represents a distance between the center of the utmost outside diaphragm 16 and the center of the convexity 16a), and R represents an effective radius of the diaphragm 16 (i.e., a radius of a part of the diaphragm that is applied with the pressure). Here, a parameter α as a configuration factor is defined as:

$$\alpha = \left(\frac{L}{H}\right) \times \frac{\left(\frac{L}{W}\right)}{P} \times \left(\frac{r0}{R}\right).$$

In the sensor 1, the parameter α is set to be in a range between 2.5 and 3.5.

Specifically, the height H of the convexity 16a is 0.22 mm, the width W of the convexity 16a is 1.44 mm, the pitch P between the convexities 16a is 2.1 mm, the distance r0 between the convexity 16a and the center of the diaphragm 16 is 7.75 mm, and the effective radius R of the diaphragm 16 is 9.3 mm.

When the parameter α is set to be in a range between 2.5 and 3.5, the sensor 1, i.e., the diaphragm 16 has following advantages. In the sensor 1, the pressure is introduced into the first pressure chamber 3 through the first port 7a. The pressure is applied to the top of the pressure detection portion of the pressure sensor chip 5 through the diaphragm 16 and the oil 18. On the other hand, the pressure is also introduced into the second pressure chamber 4 through the second port 8a. The pressure is applied to the bottom of the pressure detection portion of the pressure sensor chip 5 through the diaphragm 16 and the oil 18. Thus, the difference between the pressure introduced into the first pressure chamber 3 and the pressure introduced into the second pressure chamber 4 is detected by the pressure sensor chip 5. Specifically, the chip 5 detects the pressure loss of the emission gas before passing through the filter and after passing through the filter.

Here, the emission gas of the engine of the diesel powered vehicle as a detection object (i.e., pressure medium) is introduced into the first and second pressure chambers 3, 4, so that the sensor 1 is used in such a harsh environment. However, the chip 5 is sealed with the metallic diaphragm 16 and the oil 18 so that the chip 5 does not contact the emission gas directly. Therefore, the chip 5 is protected from the harsh environment, i.e., the corrosion environment.

The sensor 1 is mounted on the vehicle. Therefore, the atmospheric temperature around the sensor 1 usually changes largely. When the temperature changes, the oil 18 sealed in the first and second pressure chambers 3, 4 expands or contracts. The expansion or the contraction of the oil 18 may affect the pressure detection portion of the chip 5 so that the detection error of the pressure sensor 1 may be caused. Specifically, when the sensor 1 is used under comparatively low pressure (e.g., 100 kPa), the detection error may become larger.

In view of the above problem, the sensor 1 has a predetermined construction. Specifically, the configuration factor α is set to be in a range between 2.5 and 3.5. Further, the number of the convexities 16a is decided to be two. In this case, the metallic diaphragm 16 shows excellent deformability (i.e., flexibility) without enlarging the diameter of the diaphragm 16. Therefore, the expansion or the contraction of the oil 18 in accordance with the temperature change can be absorbed by the deformation of the diaphragm 16. Specifically, the diaphragm 16 is easily deformed (i.e., displaced) so that the expansion or the contraction of the oil 18 does not affect the chip 5 substantially. Thus, the detection error of the sensor 16 is reduced.

The above advantage of the sensor 1 is described in detail as follows. FIGS. 4A–7 show a relationship between an arrangement of the convexities 16a and the deformability of the diaphragm. Here, the effective radius R of the diaphragm 16 is 9.3 mm.

Figure 4A:
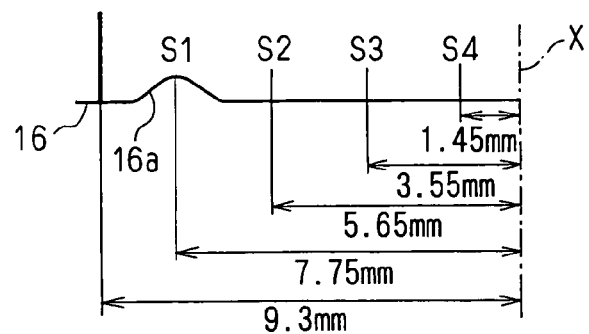
FIG. 4A is a schematic cross sectional view explaining a position of the convexity.
Figure 4B:
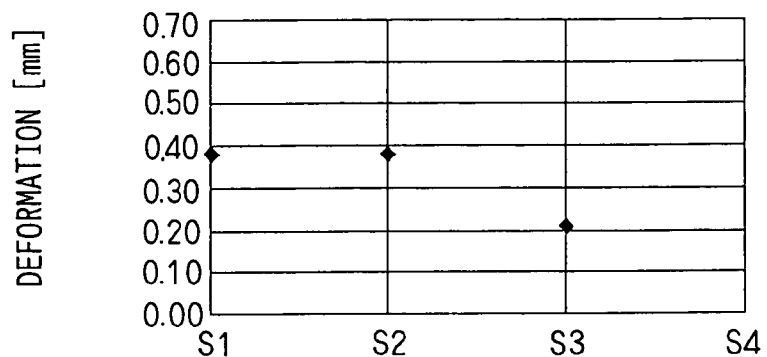
FIG. 4B is a graph showing a relationship between the position of the convexity and deformation of the diaphragm, according to the preferred embodiment.

In FIGS. 4A and 4B, in a case where the sensor 1 has a single convexity 16a, the deformation (i.e., the displacement) of the diaphragm 16 having the single convexity 16a disposed in a different position is calculated by simulation. X represents the center axis of the diaphragm. S1 represents a position of the convexity 16a apart from the center axis X at the distance r0 of 7.75 mm. S2 represents the position of the convexity 16a apart from the center axis X at the distance r0 of 5.65 mm. S3 represents the position of the convexity 16a apart from the center axis X at the distance r0 of 3.55 mm. S4 represents the position of the convexity 16a apart from the center axis X at the distance r0 of 1.45 mm. Here, the width of the convexity 16a is 1.44 mm, and the height H of the convexity 16a is 0.2 mm. The sensor 1 is heated at 25° C. and is applied with the pressure of 30 kPa.

As shown in FIG. 4B, when the convexity 16a is disposed at the positions of S1 and S2 in a case where the sensor has the single convexity 16a, the deformation of the diaphragm 16 becomes maximum.

Figure 5:
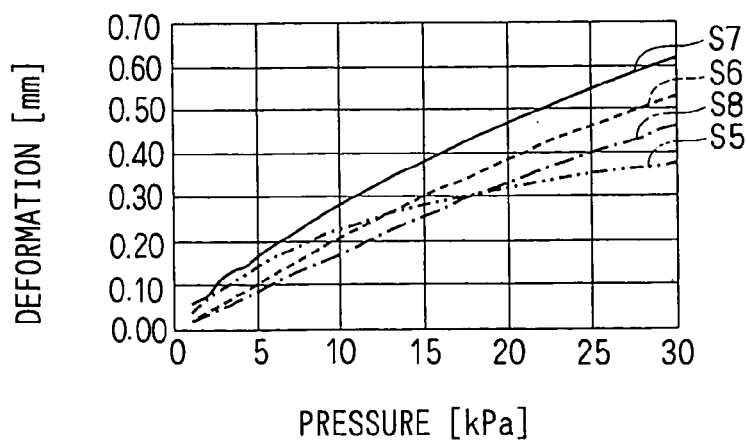
FIG. 5 is graph showing a relationship between pressure and the deformation of the diaphragm in different sensors, according to the preferred embodiment.

In FIG. 5, in a case where the sensor 1 has multiple convexities 16a, the deformation of the diaphragm 16 having multiple convexities 16a is calculated by simulation. Specifically, FIG. 5 shows a relationship between the deformation of the diaphragm 16 and the pressure applied to the sensor 1 having different convexities 16a. S5 represents the sensor 1 having four convexities disposed at four positions of S1–S4, respectively. S6 represents the sensor 1 having three convexities disposed at three positions of S1–S3, respectively. S7 represents the sensor 1 having two convexities disposed at two positions of S1–S2, respectively. S8 represents the sensor 1 having a single convexity disposed at the position of S1. Here, the effective radius R of the diaphragm 16 is 9.3 mm. The width of the convexity 16a is 1.44 mm, and the height H of the convexity 16a is 0.2 mm. The sensor 1 is heated at 25° C. and is applied with the pressure.

As shown in FIG. 5, when the sensor 1 has two convexities 16a disposed at the positions of S1 and S2 (i.e., when the sensor 1 is the sensor S7), the deformation of the diaphragm 16 becomes maximum. This is because it is not sufficient to deform the diaphragm 16 in the sensor S8 having the single convexity 16a. Further, in the sensor S5, S6 having more than two convexities 16a, at least one convexity 16a is disposed inside of half of the radius of the diaphragm 16. Specifically, the convexity 16a is disposed near the center axis X of the diaphragm 16 so that flexural rigidity of the diaphragm 16 becomes higher. Therefore, flexibility of the diaphragm 16 becomes small so that the diaphragm 16 is not deformed sufficiently.

Figure 6:
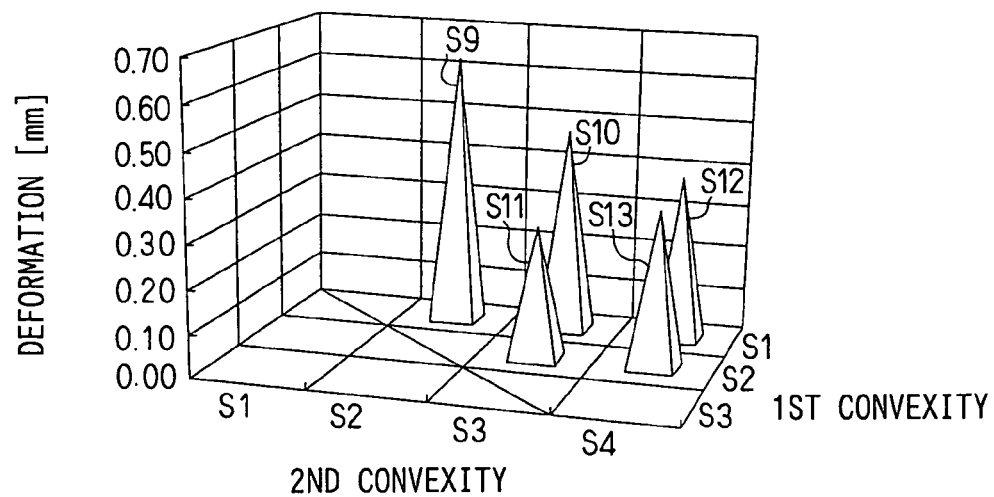
FIG. 6 is three-dimensional graph showing a relationship between the position of the convexities and the deformation of the diaphragm in different sensors, according to the preferred embodiment.

In FIG. 6, in a case where the sensor 1 has two convexities 16a, the deformation of the diaphragm 16 having two convexities 16a disposed at different positions is calculated by simulation. S9 represents the sensor 1 having two convexities 16a disposed at the positions S1, S2, respectively. Specifically, the first convexity 16a, which is disposed outside of the second convexity 16a, is disposed at the position S1, and the second convexity 16a is disposed at the position S2. S10 represents the sensor 1 having two convexities 16a disposed at the positions S1, S3, respectively. S11 represents the sensor 1 having two convexities 16a disposed at the positions S2, S3, respectively. In this case, the first convexity 16a is disposed at the position S2, and the second convexity 16a is disposed at the position S3. S12 represents the sensor 1 having two convexities 16a disposed at the positions S1, S4, respectively. S13 represents the sensor 1 having two convexities 16a disposed at the positions S2, S4, respectively. Here, the effective radius R of the diaphragm 16 is 9.3 mm. The width of the convexity 16a is 1.44 mm, and the height H of the convexity 16a is 0.2 mm. The sensor 1 is heated at 25° C. and is applied with the pressure of 30 kPa.

As shown in FIG. 6, when the sensor 1 has two convexities 16a disposed at the positions of S1 and S2 (i.e., when the sensor 1 is the sensor S9), the deformation of the diaphragm 16 becomes maximum. Accordingly, in a case where the sensor 1 has two convexities 16a, the convexities 16a are required to be disposed outside of the diaphragm 16 as much as possible. Specifically, the distance r0 is required to become larger to the utmost.

Figure 7:
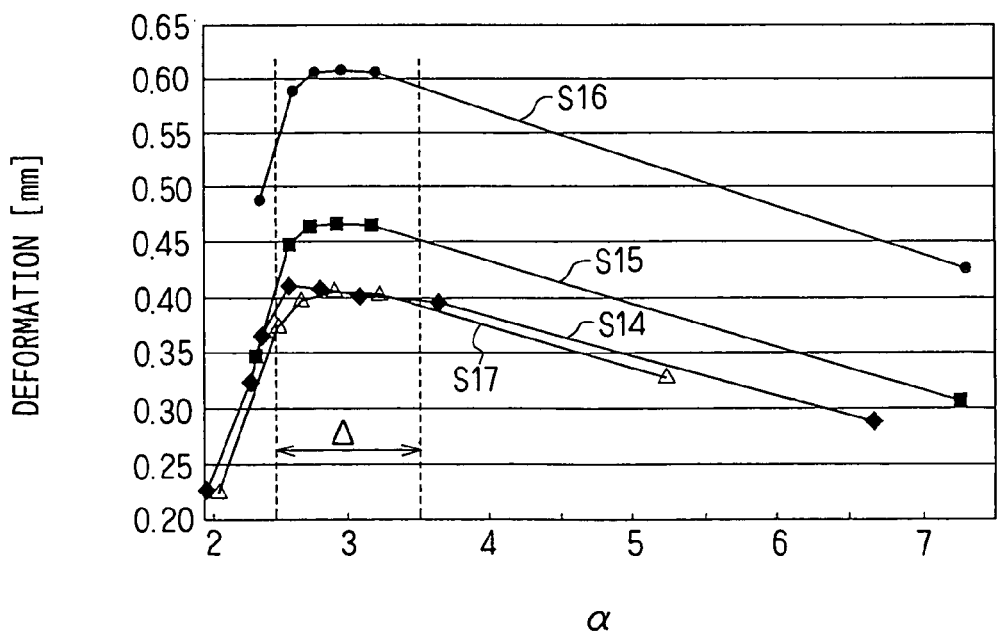
FIG. 7 is graph showing a relationship between a configuration factor α and the deformation of the diaphragm in different sensors, according to the preferred embodiment.

In FIG. 7, in a case where the sensor 1 has multiple convexities 16a, the deformation of the diaphragm 16 with multiple convexities 16a having different constructions is calculated by simulation. Specifically, FIG. 7 shows a relationship between the deformation of the diaphragm 16 and the configuration factor α. S14 represents the sensor 1 having three convexities 16a. Specifically, each convexity 16a has the width W of 1.8 mm, and the pitch P of 2.5 mm, and the distance r0 of 6.8 mm between the utmost outside convexity 16a and the center axis X. S15 represents the sensor 1 having four convexities 16a. Specifically, each convexity 16a has the width W of 1.44 mm, and the pitch P of 2.1 mm, and the distance r0 of 7.75 mm between the utmost outside convexity 16a and the center axis X. S16 represents the sensor 1 having two convexities 16a. Specifically, each convexity 16a has the width W of 1.44 mm, and the pitch P of 2.1 mm, and the distance r0 of 7.75 mm between the utmost outside convexity 16a and the center axis X. S17 represents the sensor 1 having four convexities 16a. Specifically, each convexity 16a has the width W of 0.95 mm, and the pitch P of 1.8 mm, and the distance r0 of 7.1 mm between the utmost outside convexity 16a and the center axis X. Here, the effective radius R of the diaphragm 16 is 9.3 mm. The sensor 1 is heated at 25° C. and is applied with the pressure of 30 kPa.

As shown in FIG. 7, when the configuration factor α is in a certain range Δ between 2.5 and 3.5, the deformation of the diaphragm 16 becomes maximum. Specifically, even when the sensor 1 has multiple convexities 16a having different constructions, the deformation of the diaphragm 16 becomes maximum in a case where the configuration factor α is in the range Δ between 2.5 and 3.5. Further, when the sensor 1 has two convexities 16a having the width W of 1.44 mm, the height H of 0.22 mm, the pitch P of 2.1 mm and the distance r0 of 7.75 mm (i.e., when the sensor 1 is the sensor S16), the deformation of the diaphragm 16 becomes maximum.

Further, the inventors have studied a relationship between the height H of the convexity 16a and the deformation of the diaphragm 16. Furthermore, the inventors have studied a relationship between the width W of the convexity 16a and the deformation of the diaphragm 16. As a result of these further studies, it is preferred that the height H of the convexity 16a is in a range between 0.16 mm and 0.28 mm, and the width W of the convexity 16a is in a range between 1.3 mm and 1.5 mm.

In the preferred embodiment, the configuration factor α is defined so that the diaphragm 16 has excellent deformability (i.e., excellent flexibility). When the configuration factor α is in the range Δ between 2.5 and 3.5, the metallic diaphragm 16 has the excellent deformability so that the expansion or the contraction of the oil 18 sealed in the pressure chambers 3, 4 in accordance with the temperature change can be absorbed sufficiently. Thus, the detection error of the sensor 1 is suppressed.

Further, the effective radius R of the diaphragm 16, and the height H, the width W, the number and the position of the convexities 16a are optimized to obtain the excellent deformability of the diaphragm 16. The deformability of the diaphragm 16 is improved without enlarging the effective radius R of the diaphragm 16. Specifically, the diaphragm 16 has excellent deformability without enlarging the size (i.e., the dimensions) of the sensor 1.

Furthermore, when the sensor 1 has two convexities 16a, the diaphragm 16 show the maximum deformability.

Although the sensor 1 is the differential pressure type pressure sensor having two pressure chambers 3, 4 with two diaphragms 16 for sealing the oil 18, the sensor 1 can be other type of pressure sensor such as a pressure sensor having a pressure sensor chip, the bottom of which is applied with the atmospheric pressure. Specifically, the sensor 1 can have a single diaphragm so that only an upper pressure chamber is sealed air-tightly, i.e., only the top of the pressure sensor chip is sealed.

Although the sensor 1 is used for the diesel-powered vehicle for detecting the emission gas pressure, the sensor 1 can be used for other applications.

Although the sensor 1 has a predetermined construction such as the casing 2 and the like, the sensor 1 can have other constructions of the casing and the like. Further, as long as the configuration factor α is in the certain range Δ between 2.5 and 3.5, the sensor 1 can have multiple convexities 16a more than two. Further, the sensor 1 can have another diaphragm 16 having different construction, as long as the configuration factor α is in the range Δ between 2.5 and 3.5.

Such changes and modifications are to be understood as being within the scope of the present invention as defined by the appended claims.

What is claimed is:

1. A pressure sensor comprising:
a diaphragm for sealing liquid,
wherein the diaphragm includes a plurality of convexities, which are disposed concentrically on the diaphragm,
wherein each convexity has a circular arc cross section in a radial direction and has a ring shape,
wherein each convexity has a length of the circular arc representing as L, a height of the convexity representing as H, a width of the convexity in the radial direction representing as W, and a pitch between two adjacent convexities in the radial direction representing as P,
wherein the diaphragm has an effective radius representing as R, and a distance between a center of the diaphragm and a center of the convexity disposed utmost outside of the diaphragm representing as r0, the effective radius of the diaphragm being defined as a radius of a part of the diaphragm applied with pressure,
wherein the sensor has a configuration factor representing as α, which is defined as:

$$\alpha = \left(\frac{L}{H}\right) \times \frac{\left(\frac{L}{W}\right)}{P} \times \left(\frac{r0}{R}\right), \text{ and}$$

wherein the configuration factor is in a range between 2.5 and 3.5.

2. The sensor according to claim 1,
wherein the diaphragm has two convexities.

3. The sensor according to claim 1,
wherein the diaphragm is made of metal, and
wherein the liquid is made of oil.

4. The sensor according to claim 1,
wherein the height of the convexity is in a range between 0.16 mm and 0.28 mm,
wherein the width of the convexity is in a range between 1.3 mm and 1.5 mm, and
wherein the convexity is disposed outside of half of the effective radius of the diaphragm.

5. The sensor according to claim 1,
wherein the effective radius of the diaphragm is about 9.3 mm, and
wherein the sensor is used under comparatively low pressure.

6. The sensor according to claim 1,
wherein the sensor is used for detecting emission gas pressure of a diesel-powered vehicle.

* * * * *